United States Patent [19]

Someya

[11] 4,306,776
[45] Dec. 22, 1981

[54] ZOOM LENS HAVING THREE MOVABLE LENS GROUPS

[75] Inventor: Atsushi Someya, Machida, Japan

[73] Assignee: Canon Kabushiki Kaisha, Tokyo, Japan

[21] Appl. No.: 99,924

[22] Filed: Dec. 3, 1979

[30] Foreign Application Priority Data

Dec. 5, 1978 [JP] Japan .................. 53-150708

[51] Int. Cl.$^3$ ............................................. G02B 15/14
[52] U.S. Cl. ............................................. 350/427
[58] Field of Search ...................... 350/427, 428, 423

[56] References Cited

U.S. PATENT DOCUMENTS

| | | | |
|---|---|---|---|
| 3,481,666 | 12/1969 | Hoguchi | 350/427 |
| 3,533,678 | 10/1970 | Altman et al. | 350/427 |
| 3,619,035 | 11/1971 | Hopkins | 350/427 |
| 3,771,853 | 11/1973 | Nakamura | 350/427 X |
| 3,975,089 | 8/1976 | Betensky | 350/427 |
| 4,135,786 | 1/1979 | Ikemori | 350/427 |
| 4,196,969 | 4/1980 | Itoh | 350/423 |

*Primary Examiner*—John K. Corbin
*Assistant Examiner*—Scott J. Sugarman
*Attorney, Agent, or Firm*—Toren, McGeady & Stanger

[57] ABSTRACT

In the disclosed zoom lens of the mechanical compensation type, a first movable lens group, a second movable lens group, a third movable lens group and a fixed lens group are located in sequence from the object end. The first, second and third lens groups are simultaneously moved along the optical axis independently of each so as to change the focal length. The first movable lens group is placed closer to the image at the end of the wide angle position rather than at the end of the telephoto position, while during zooming, the axial movement of the first movable lens from the extreme wide angle position to the extreme telephoto position is smaller than that of the third movable lens group. On the other hand, during focusing, the second and the third lens groups are fixed, while the first movable lens group is moved.

5 Claims, 15 Drawing Figures

F I G. 2A
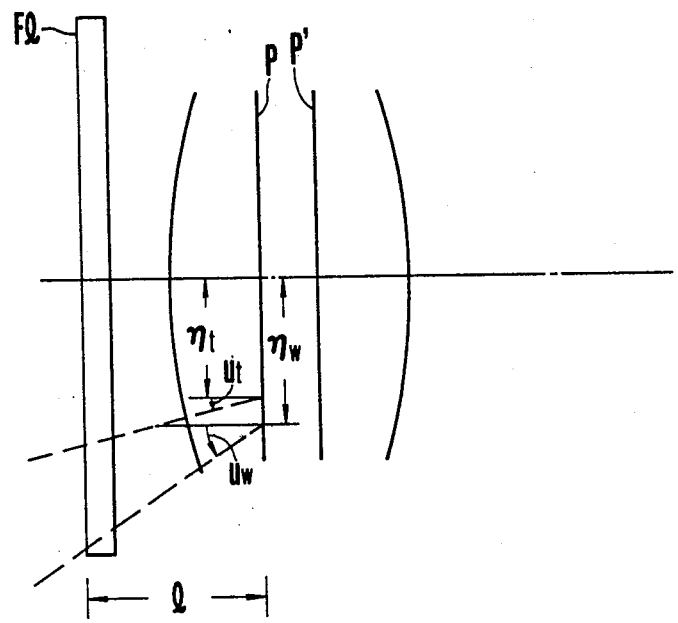
F I G. 2B
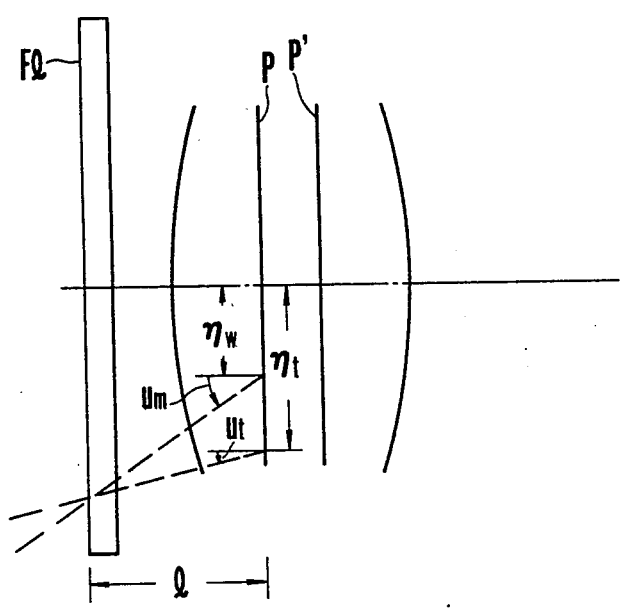

FIG.6A  FIG.6B  FIG.6C
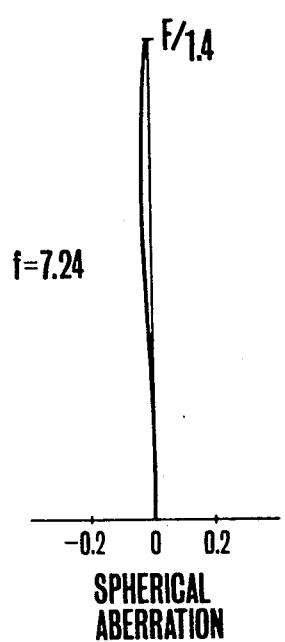 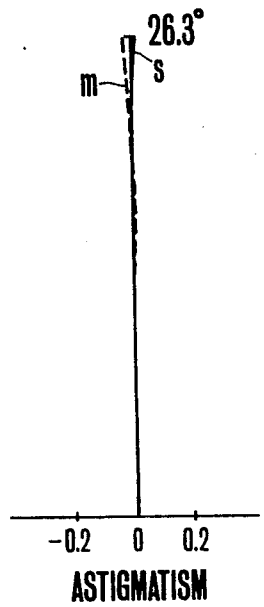 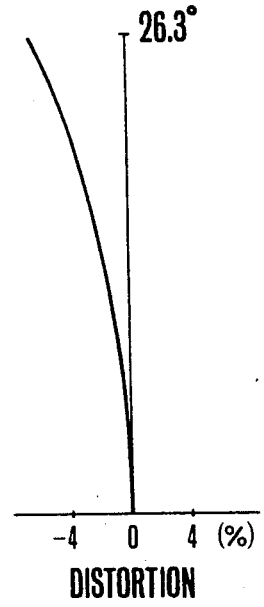
FIG.7A  FIG.7B  FIG.7C
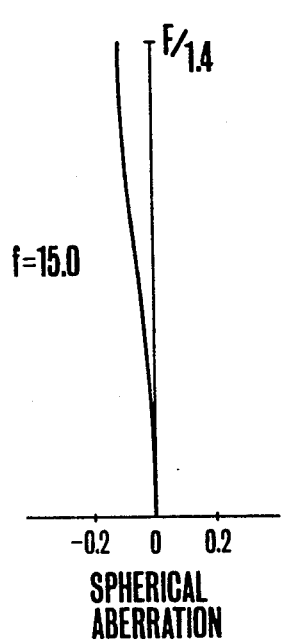 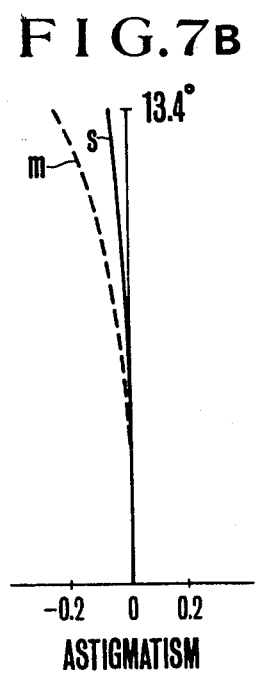 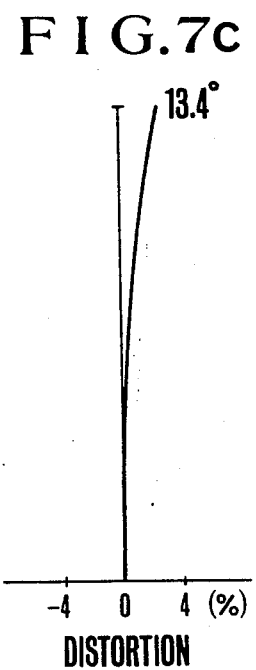

SPHERICAL ABERRATION    ASTIGMATISM    DISTORTION

ZOOM LENS HAVING THREE MOVABLE LENS GROUPS

BACKGROUND OF THE INVENTION

1. Field of Invention

The present invention relates to a zoom lens, particularly of the mechanical compensation type.

2. Description of Prior Art

Quite recently, the magnification ratio of zoom lenses used with compact motion picture cameras have been considerably increased. However, a zoom lens with high magnification factor becomes unavoidably large and heavy with inferior operability so that a compact lens is desirable. Under such circumstances, attempts have been made to make the whole system compact in the state while the given focal length and the given F number are kept unchanged by increasing the refractive power of each group constituting the zoom lens so as to make the travel of the movable lens group small during the zooming operation. This would minimize the increase in the total length and the diameter.

However, these refractive-index increases result in difficulty in achieving aberration correction and require severe control of the manufacturing accuracy in the design and the manufacture of the zoom lens. Ultimately, if is disadvantageous for a practical zoom lens of high quality. Below, the difficulties of realizing a compact lens will be explained in detail in accordance with embodiments of a conventional zoom lens.

Table 1 shows data concerning the zoom lens mentioned as the first embodiment in U.S. Pat. No. 3,972,591 and having a focal length 7.238–68.79 and F Number 1:1.4. The data shows focal lengths and the distance between the principal points of the respective groups.

TABLE 1

| Lens group | Focal length | Distance between principal points | | |
|---|---|---|---|---|
| | | $f = 7.238$ | $f = 15.72$ | $f = 68.79$ |
| 1 | 61.153 | 8.79 | 22.616 | 36.442 |
| 2 | −15.120 | 79.38 | 58.365 | 23.287 |
| 3 | 35.716 | 5.226 | 12.415 | 33.667 |
| 4 | −49.989 | 37.23 | 37.23 | 37.23 |
| 5 | 26.586 | | | |

In this zoom lens, the first, the second the third and the fourth groups constitute an afocal portion. Decreasing the afocal zoom part proportionally and keeping the relay lens group unchanged, produces a zoom lens whose focal length range for the whole system is same whose linear scale for the zoom part is decreased. When the figures for the first, the second, the third and the fourth groups among the data in Table 1 are multiplied by 0.8, a compact lens shown in Table 2 is realized.

TABLE 2

| Lens group | Focal length | Distance between principal points | | |
|---|---|---|---|---|
| | | $f = 7.238$ | $f = 15.72$ | $f = 68.79$ |
| 1 | 48.9224 | 7.032 | 18.0928 | 29.1536 |
| 2 | −12.096 | 63.504 | 46.692 | 18.6296 |
| 3 | 28.5728 | 4.1808 | 9.932 | 26.9336 |
| 4 | −39.9912 | 37.23 | 37.23 | 37.23 |
| 5 | 26.586 | | | |

In order to learn quantitatively the extent of the difference between the lenses in accordance with Tables 1 and 2, the height $\bar{h}_1$ at which the paraxial principal ray passes through the principal plane of the first group is calculated for the short focal length as well as for the long focal length, while $\Sigma 1/fi$ is obtained as the factor for comparing the Petzval sum thereby. The value $\bar{a}_1$ of the angle at which the paraxial principal ray is incident on the first group at the end of the wide angle side in the state in which the lens is focused at the infinite distance is taken 1, the whole system is normalized with the focal distance 7.238 at the end of the wide angle side, the aperture is arranged at the distance 13.68 mm behind the fourth group and the object is at the distance 1.2 m.

The height $\eta$ at which the largest field angle principal ray is incident on the principal plane of the first group when the aberration and the distortion are eliminated is $$\eta = \bar{h}_1 \times \bar{y}max$$

wherein $\bar{y}max$ is the largest ideal image height. Consequently, $\bar{h}_1$ can be used as quantitative scale for comparing the size of the zoom lenses, particularly the diameters of the lens of the first group or that of the filter to be mounted before the lens.

TABLE 3

| | $\bar{h}_1$ w | $\bar{h}_1$ t | $\Sigma 1/fi$ |
|---|---|---|---|
| Zoom Lenses (Table 1) | 5.4766 | 6.2680 | −0.004177 |
| Zoom Lenses (Table 2) | 4.2927 | 5.2318 | −0.014625 |

Table 3 shows $\bar{h}_1 w$ in the extreme wide angle position, $\bar{h}_1 t$ in the extreme telephoto position and $\Sigma 1/fi$. The values $h_1$ of the lens in accordance with Table 2 are about 0.8 times as large as those of the lens in accordance with Table 1. The diameter of the first group is also about 0.8 time as large when the focal length of the respective groups of the zoom part and the distance between the principal points of the groups are proportionally decreased. On the other hand, $\Sigma 1/fi$ of the lens in accordance with Table 2 is larger in absolute value, which means the curvature of field is over-corrected in comparison with the lens in accordance with Table 1 in such a manner that it is difficult to take a balance between the spherical aberration and the curvature of field.

SUMMARY OF THE INVENTION

A first purpose of the present invention is to decrease the total length of the zoom lens without decreasing the magnification ratio and increasing aberrations.

A second purpose of the present invention is to decrease the diameter of the first lens or the filter.

For the above-mentioned purposes, the first, the second and the third groups are moved simultaneously during the zooming, the total length of the whole optical system is smaller in the extreme wide angle position than at the extreme telephoto position and the movement amount of the first group is set to be smaller than that of the third group during the zooming. Further, in an embodiment in accordance with the present invention a positive refractive power is selected for the first and the third groups, while a negative refractive power is selected for the second group, and the first and the third groups are moved monotonously during zooming (in such a manner that the movement trace has no maximum or minimum value).

BRIEF DESCRIPTION OF THE DRAWINGS

FIGS. 2A and 2B respectively show the incident light beam on the front lens at the ends of the zooming.

FIGS. 6A, 6B and 6C show the aberrations of the numerical embodiment at the end of the wide angle side.

FIGS. 7A, 7B and 7C show the aberrations at the middle focal length.

DESCRIPTION OF THE PREFERRED EMBODIMENT

Figure 1:
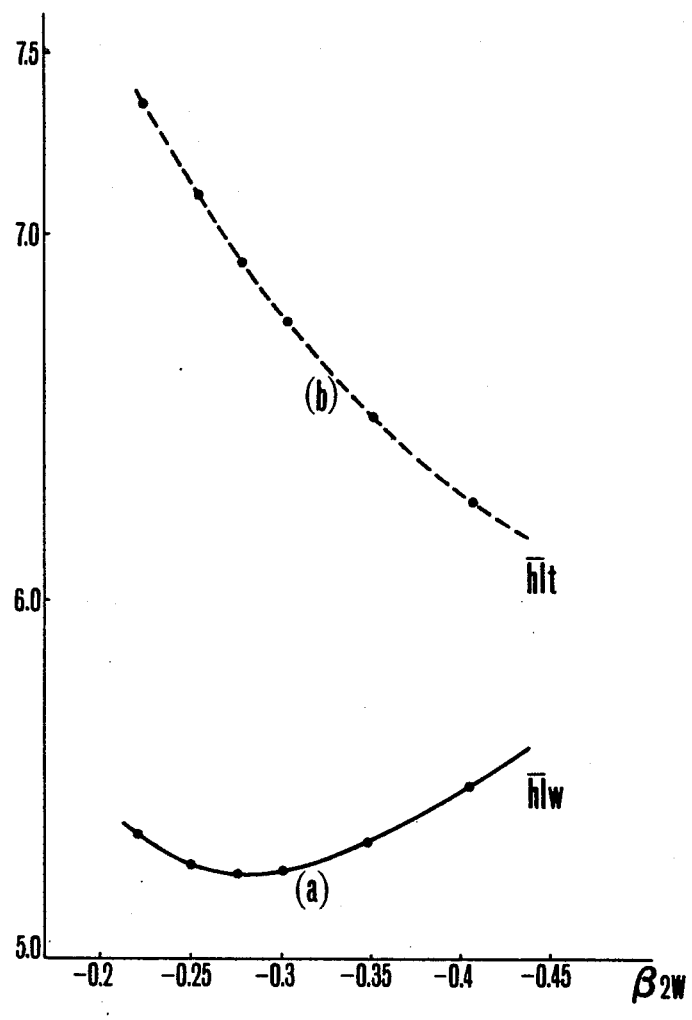
FIG. 1 shows the variation of the incident height of the paraxial principal ray on the principal plane of the first group with reference to the variation of the image forming magnification ratio of the second group.

In the zoom lens whose characteristics are depicted in FIG. 1, the height $\bar{h}_1w$ and $\bar{h}_1t$ at which the paraxial principal rays strike the principal plane of the first group in the respective extreme wide angle and telephoto modes or positions vary with changes in the value of the image forming magnification ratio $\beta_2w$ at the extreme wide angle position of the second group in the state. This occurs when the focal length of the second and the third groups, that of the fifth group relay lens, and the distance between the principal point of the first group and that of the second group, the distance between the principal point of the third group and that of the fourth group and the distance between the fourth group and the fifth group are kept at the same value. Also the focal distance of the first group and the fourth group and the distance between the principal point of the second group and that of the third group are determined in such a manner that the focal distance and the back focus in the extreme wide angle mode or position are not varied.

In FIG. 1, the ordinate represents $\bar{h}_1$, namely the height $\bar{h}_1$ at which the paraxial principal ray cuts the principal plane of the first group, whereby the ordinate represents the value of $\bar{h}_1$, while the abscissa represents the value of the magnification factor $\beta_2w$. The solid line (a) represents the plot of $\bar{h}_1w$ at the extreme wide angle position, and curves through a minimum. In consequence, in order that the height of the largest field angle principal ray passing through the first group or the mounted filter is lowest at the wide angle position, it is sufficient to choose the value of $\beta_2w$ when $\bar{h}_1w$ assumes its smallest value. The dotted line (b) represents the height $\bar{h}_1t$ at the extreme telephoto position, and does not curve through a minimum. Hence, the larger the negative value of magnification ratio $\beta_2w$, the smaller $\bar{h}_1w$ is.

There exists a relation $\bar{h}_1w < \bar{h}_1t$ in the range shown in FIG. 1. In order to prevent the increase of the first block diameter or the filter diameter it is generally effective when $\bar{h}_1w$ is smaller than $\bar{h}_1t$ to some extent. The reason is that in most cases the first surface of the first group or the filter is positioned before the first principal plane of the first group, while the angle of the largest field angle principal ray is, as is well known, by far larger at the end of the wide angle side. Another reason why the relation $\bar{h}_1w < \bar{h}_1t$ is desirable is the distortion of the zoom lens. In a general zoom lens a negative distortion often occurs in at the wide angle mode and a positive distortion position. When a negative distortion exists the light beam whose field angle is larger than the field angle obtained from the value of the ideal image height $\bar{y}$ divided with the focal length by the distortion can be passed, while when the positive distortion exists the situation is quite contrary. In consequence, unless $h_1w$ in the wide angle mode is further smaller, the height at which the largest field angle principal ray passes through the filter plane of the first surface of the first group is so small in the extreme telephoto position and so large in the extreme wide angle position that the diameter of the filter or that of the first surface is determined in the extreme wide angle position and still has room in the extreme telephoto position. FIG. 2(A) shows the situation. Hereby P and P' represent the principal planes of the first group, while Fl represents the filter. The incident height $\eta w(\eta w = \bar{h}_1 w \times \bar{y})$ on the first principal plane P in the extreme wide angle position is larger than that $\eta t(\eta t = \bar{h}_1 t \times \bar{y})$ in the extreme telephoto position, while the inclination Uw at the end of the wide angle side is larger than the inclination Ut at the end of the telephoto side, the diameter of the filter Fl or that of the first surface of the lens is determined with the light beam at the end of the wide angle side.

On the other hand, when, as is shown in FIG. 2(B), the incident height $\eta t$ at the end of the telephoto side is chosen larger than that $\eta w$ in the extreme wide angle position, the position at which the light beam at the telephoto side passes through the filter or the first surface is somewhat higher, while the position in the wide angle mode is lower so that it is thus possible to make the diameter of the filter or the first surface smaller.

On the other hand, such a condition cannot be obtained in a zoom lens system in which the total length of the optical system (distance between the first surface and the image plane) is invariable, so it is necessary to make the total optical length in the extreme wide angle position smaller than that in the extreme telephoto position. However, if, as is often the case in a conventional optical compensation type zoom lens, the first group and the third group are moved altogether, the distance between the first group and the second group at the telephoto side is so large that the distance from the filter to the first surface must be increased, while the total length at the wide angle side cannot be shortened much. Consequently, the relation $X_1 < X_3$ is used in relation between the movement $X_1$ of the first group and that $X_3$ of the third group during zooming.

The following is a practical way of choosing the difference between $\eta t$ and $\eta w$ in FIG. 2(B) in an example of a zoom lens composed of a positive, a negative, a positive, a negative and a positive group in sequence from the front, wherein the first four groups constitute an afocal system. Now let us suppose that the distortion at the extreme wide angle position is $-4\%$, the distortion at the extreme the telephoto position is $+4\%$, the largest ideal image height $\bar{y}$max is 3.58 mm and the distance l between the front principal plane of the first group and the filter Fl is 14 mm.

Then, $\eta t - \eta w = l(\tan Uw - \tan Ut)$ $\eta t = \bar{h}_1 t \times \bar{y}\text{max}, \eta w = \bar{h}_1 w \times \bar{y}\text{max}$ -continued $$\tan Uw = \frac{\overline{y}\max}{fw} \times 1.04, \tan Ut = \frac{-\overline{y}\max}{ft} \times 0.96$$

so $\overline{h}_1 t - \overline{h}_1 w = 1.82$.

The arrangement in the extreme wide angle position and in the extreme telephoto position are decided, when the image forming magnification ratio is $\beta_{2w}$ of the second group in the extreme wide angle position, the difference between the curves (a) and (b) in FIG. 1 is 1.82 and $f_1$, $f_4$, $e_{2w}$, $e_{1t}$, $e_{3t}$ are obtained from the predetermined values $f_2$, $f_3$, $f_5$, $e_{1w}$ and $e_{2t}$.

In the above $f_1$, $f_2$, $f_3$, $f_4$ and $f_5$ are the focal length of the first, the second, the third, the fourth and the fifth groups.

The values $e_{1w}$, $e_{2w}$ and $e_{3w}$ are the distances between the principal point of the first group and that of the second group, the distance between the principal point of the second group and that of the third group and the distance between the principal point of the third group and that of the fourth group in the extreme wide angle position.

The values $e_{1t}$, $e_{2t}$ and $e_{3t}$ are the distances between the principal point of the first group and that of the second group, the distance between the principal point of the second group, and that of the third group and the distance between the principal point of the third group and that of the fourth group in the wide angle position.

$$f_1 = \frac{f_2}{\beta_{2w}} - f_2 + e_{1w} \quad (1)$$

$$f_4 = -\frac{f_1 f_5 \beta_{2w}(f_3 - e_{3w})}{f_1 f_5 \beta_{2w} + f_w \cdot f_3} \quad (2)$$

$$e_{2w} = \left(f_1 - e_{1w} + \frac{f_1 \cdot f_3 \cdot f_5}{f_w \cdot f_4}\right) \beta_{2w} + f_3 \quad (3)$$

$$e_{1t} = f_1 + \left(\frac{f_1 f_3 f_5 + f_t f_4 (f_3 - e_{2t})}{f_t f_4 (f_2 + f_3 - e_{2t})}\right) f_2 \quad (4)$$

$$e_{3t} = f_4 + \left(\frac{f_t f_2 f_4 + f_1 f_5 (f_2 - e_{2t})}{f_1 f_5 (f_2 + f_3 - e_{2t})}\right) f_3 \quad (5)$$

Table 4 shows the structure obtained utilizing the above procedures.

TABLE 4

| Lens group | Focal length | Distance between principal points | | |
|---|---|---|---|---|
| | | f = 7.238 | f = 15.0 | f = 68.79 |
| 1 | 84.388 | 8.79 | 20.73 | 38.62 |
| 2 | −15.120 | 65.701 | 45.28 | 23.29 |
| 3 | 35.716 | 5.226 | 22.53 | 104.81 |
| 4 | −56.393 | 37.23 | 37.23 | 37.23 |
| 5 | 26.586 | | | |

Figure 3:
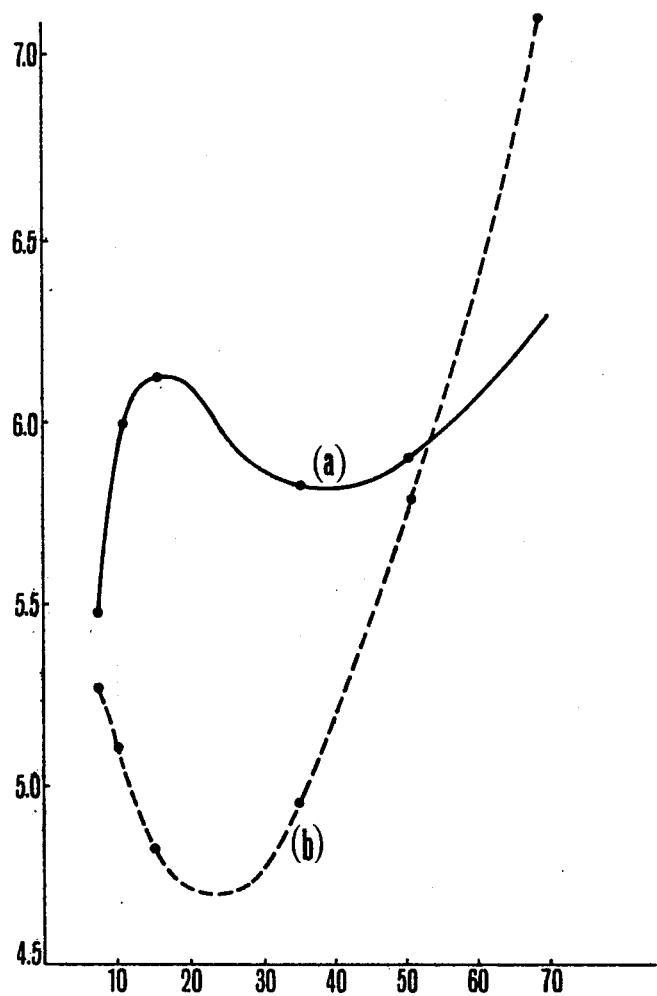
FIG. 3 shows the variation of the incident height in case of the conventional system (a) and the present embodiment (b) during the zooming.

FIG. 3 shows the variation of $\overline{h}_1$ when the zoom lens in accordance with the Table 4 and that in accordance with the Table 1 are zoomed altogether. In the drawing the ordinate represents the value $\overline{h}_1$, while the abscissa represents the focal length of the whole system, whereby the solid line (a) shows the case of the Table 1, while the dotted line (b) shows the case of the Table 4.

The total length in the extreme wide angle position is obtained as follows.

Now, let us suppose the distance between the principal points of the blocks in the wide angle mode be $L = e_{1w} + e_{2w} + e_{3w}$. The condition that the total length at the extreme wide angle position is longer than that at the telephoto side can be represented as follows:

$$e_{1t} + e_{2t} + e_{3t} \geq L \quad (6)$$

Putting the relations (4) and (5) into the relation (6), we obtain $$-f_1 f_4 f_5 f_t \left\{ e_{2t}^2 - (L - f_1 - f_4) e_{2t} + \right. \quad (7)$$

$$\left. (L - f_1 - f_4) \times (f_2 + f_3) - \frac{(f_1 f_5 + f_4 f_t)^4 f_2 f_3}{f_1 f_4 f_5 f_t} \right\} \geq 0$$

Now, let us suppose that the signs of the five groups be positive, negative, positive, negative and positive. Now, $-f_1 f_4 f_5 f_t > 0$, so that it is sufficient that the determinant is negative in order that the relation (7) is established. Namely $$(f_1 + f_4) + 2(f_2 + f_3) + 2M \geq L \geq \quad (8)$$

$$(f_1 + f_4) + 2(f_2 + f_3) - 2M$$

Thus, $M = \sqrt{\frac{(f_1 f_3 f_5 - f_2 f_4 f_t)(f_3 f_4 f_t - f_1 f_2 f_5)}{f_1 f_4 f_5 f_t}}$ Further, in order that the distance between the first and the second groups be made smaller than that in case of the optical compensation type zoom lens, the following relation is satisfied as the condition that the movement amount $X_1$ of the first group is kept smaller than $X_3$ of the third group.

$$\frac{1}{2}\left[(L - f_1 + f_3 - e_{3w}) + \sqrt{(L - f_1 + f_3 - e_{3w})^2 - 4} \right. \quad (9)$$

$$\left. (L - f_1 - e_{3w})(f_2 + f_3) + 4 \frac{f_2 f_3}{f_t f_4}(f_t f_5 + f_1 f_4)\right] \geq e_{2t}$$

In the zoom lens for which the above relations are satisfied, as is shown in FIG. 2(B), the optimal relation of the largest field angle principal ray is obtained at the extreme end of the wide angle range and that of the telephoto range in such a manner that the diameter of the filter or the first plane can be decreased.

Figure 4:
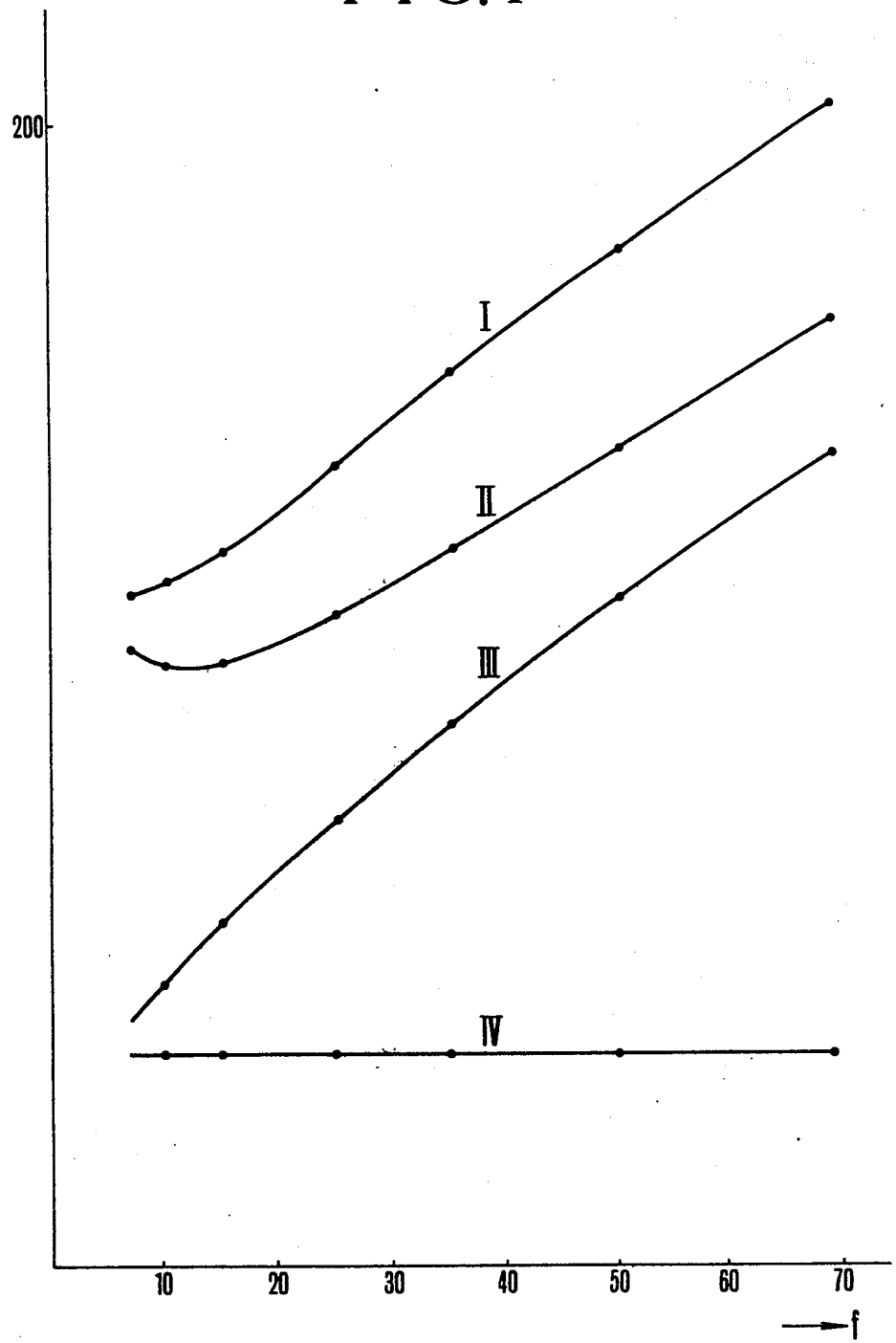
FIG. 4 shows the movement trace of the lens group of the embodiment.

FIG. 4 shows the trace of the movement of the first group I, the second group II and the third group III when the zoom lens in accordance with the Table 4 is zoomed. IV represents the fourth group. In the drawing, the ordinate represents the position measured from the image plane on the optical axis, while the abscissa represents the focal length of the total system.

Table 5 shows the values $\overline{h}_1 w$, $\overline{h}_1 t$ and $\Sigma 1/f_i$ of the structure in accordance with the Table 4. A comparison of the value $\Sigma 1/f_i$ with lens shown in Table 3 and the lens in accordance with Table 2 shows that the aberration is substantially improved.

TABLE 5

| | $\overline{h}_1 w$ | $\overline{h}_1 t$ | $\Sigma 1/f_i$ |
|---|---|---|---|
| Zoom lens (Table 4) | 5.2650 | 7.100 | −0.006408 |

Figure 5:
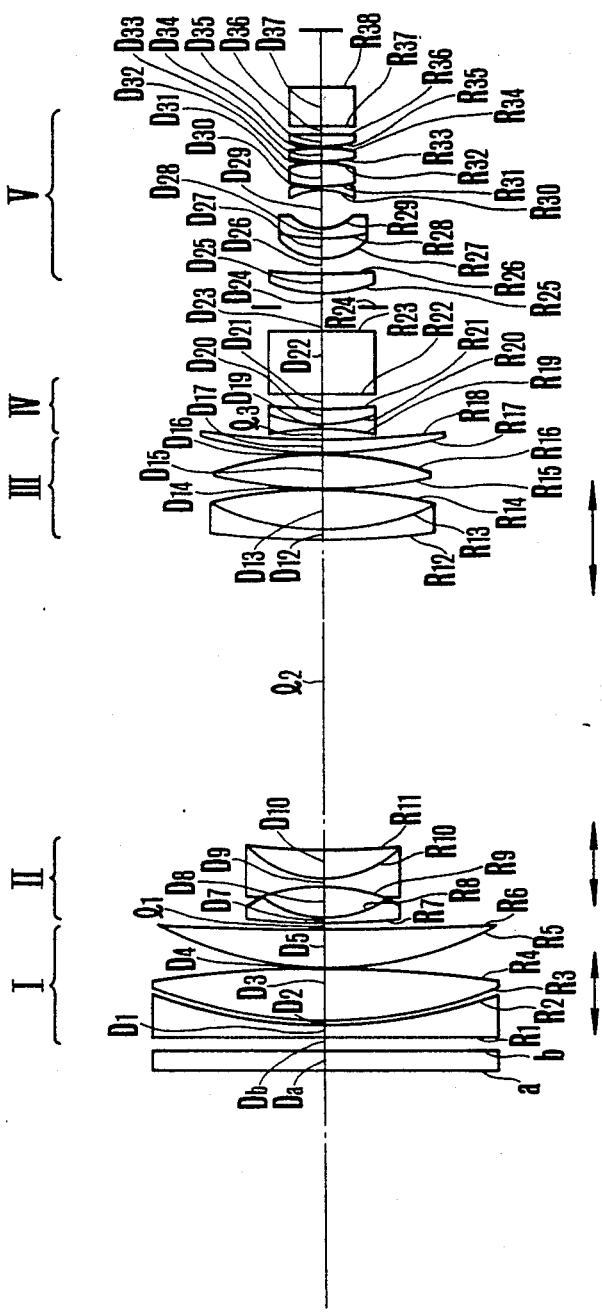
FIG. 5 shows the lenses corresponding to the numerical embodiment in section.

Below, an embodiment of the zoom lens (FIG. 5) realized in accordance with the above conditions will be given.

| Focal length f = 7.24 - 15.0 - 68.78 | | | | |
|---|---|---|---|---|
| Number of planes | R | D | Nd | ν |
| a | ∞ | 3.50 | 1.51633 | 64.1 |
| b | ∞ | 2.00 | | |
| 1 | 1465.605 | 2.35 | 1.80518 | 25.4 |
| 2 | 94.304 | 0.50 | | |
| 3 | 78.557 | 8.50 | 1.64000 | 60.1 |
| 4 | −238.920 | 0.20 | | |
| 5 | 62.403 | 6.50 | 1.64000 | 60.1 |
| 6 | 467.749 | $l_1$ | | |
| 7 | 118.650 | 1.00 | 1.71300 | 53.9 |
| 8 | 20.045 | 5.30 | | |
| 9 | −31.914 | 1.10 | 1.77250 | 49.6 |
| 10 | 20.250 | 4.65 | 1.80518 | 25.4 |
| 11 | 99.920 | $l_2$ | | |
| 12 | 211.760 | 1.19 | 1.80518 | 25.4 |
| 13 | 41.725 | 6.98 | 1.48749 | 70.1 |
| 14 | −80.952 | 0.10 | | |
| 15 | 84.116 | 6.00 | 1.71300 | 53.9 |
| 16 | −56.078 | 0.10 | | |
| 17 | 81.483 | 2.50 | 1.71300 | 53.9 |
| 18 | 170.846 | $l_3$ | | |
| 19 | −60.892 | 0.80 | 1.65844 | 50.9 |
| 20 | 23.702 | 2.50 | 1.78470 | 26.2 |
| 21 | 64.753 | 2.35 | | |
| 22 | ∞ | 11.00 | 1.63854 | 55.4 |
| 23 | ∞ | 4.00 | | |
| 24 | aperture | 2.29 | | |
| 25 | 23.165 | 3.24 | 1.76200 | 40.2 |
| 26 | 68.220 | 2.73 | | |
| 27 | 11.851 | 3.07 | 1.71300 | 53.9 |
| 28 | 28.392 | 1.87 | 1.80518 | 25.4 |
| 29 | 8.634 | 6.00 | | |
| 30 | −14.699 | 1.00 | 1.80518 | 25.4 |
| 31 | 54.470 | 3.73 | 1.69100 | 54.8 |
| 32 | −19.950 | 0.56 | | |
| 33 | 100.350 | 2.06 | 1.66680 | 33.0 |
| 34 | −38.123 | 0.10 | | |
| 35 | 20.500 | 1.98 | 1.58267 | 46.4 |
| 36 | −685.695 | 1.20 | | |
| 37 | ∞ | 6.80 | 1.63854 | 55.4 |
| 38 | ∞ | | | |

Here, (R22, R23) and (R37, R38) are the beam splitting prism, while (a, b) the filter.

| | f = 7.24 | f = 15.0 | f = 68.78 |
|---|---|---|---|
| $l_1$ | 1.01 | 12.95 | 30.84 |
| $l_2$ | 53.83 | 32.41 | 10.42 |
| $l_3$ | 1.51 | 18.82 | 101.10 |

$f_1 = 84.39$
$f_2 = -15.12$
$f_3 = 35.72$
$f_4 = -56.39$
$f_5 = 26.59$

Figure 8A:
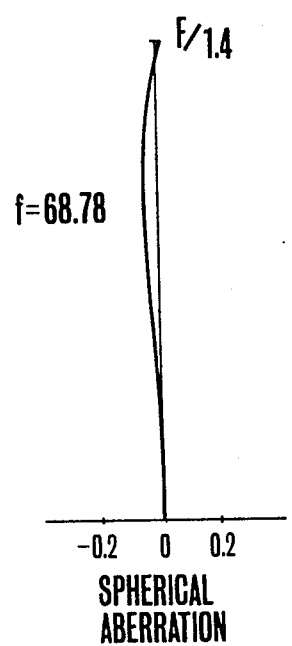
FIGS. 8A, 8B and 8C show the aberrations at the end of the telephoto side.
Figure 8B:
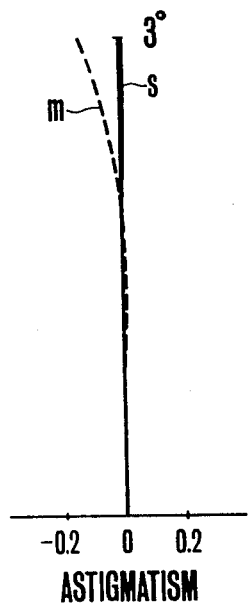
Figure 8C:
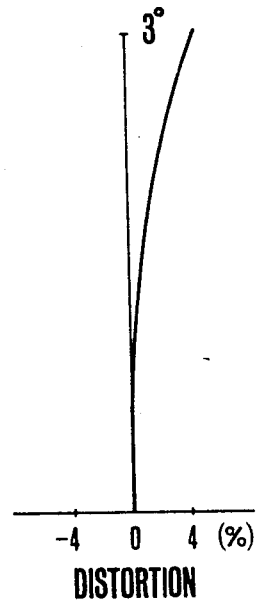

The trace of the movement of the zoom lens during the zooming is same as is shown in FIG. 4. FIGS. 6, 7 and 8 respectively show the spherical aberration, the astigmatism and the distortion for the object at the infinite distance at the end of the wide angle side, at the middle focal length and at the extreme telephoto position.

The above embodiment relates to a zoom lens consisting of five groups including an afocal part. The principle can be applied also to the zoom lens without the afocal part as well as the optical system without the relay lens such as television camera.

On the other hand, the purpose of making the incident height ht on the principal plane at the extreme telephoto position larger than ηw at the extreme wide angle position can be fulfilled with the following construction.

The first group for focusing, the second and the third groups for the magnification ratio variation and the focal point compensation, the fourth group for converting the light beam afocally and the fifth group for the image forming are arranged in sequence in such a manner that at the same time with the movement of the second and the third groups, the fourth group and the photographing aperture are moved altogether, while the fourth group and the aperture are closer to the object in the wide angle range than in the telephoto range.

As explained so far, in accordance with the present information affords a compact zoom lens having the high magnification ratio mentioned, and the image forming efficiency can fully be compared to that of the conventional large zoom lens.

What is claimed is:

1. A mechanical compensation zoom lens having an optical axis and operable in a telephoto range and a wide angle range, comprising:

a first movable lens group at the frontmost portion of the zoom lens movable along the optical axis for focusing and zooming of the zoom lens, the position of said lens group being closer to the image at the end of the wide angle range than at the end of the telephoto range;

a second movable lens group arranged closer to the image than the first movable lens group and fixed during focusing but movable along the optical axis with the first movable lens group but independently of the first movable lens group; and a third movable lens group closer to the image than the second movable lens group and fixed during focusing but movable along the optical axis with the first movable lens group in the same direction and independently of the first movable lens group during zooming, the amount of movement of said third lens group along the optical axis for zooming being larger than that of the first movable lens group.

2. A zoom lens according to claim 1, wherein the first and the third movable lens groups have a positive refractive power, while the second movable lens group has a negative refractive power.

3. A zoom lens according to claim 1, wherein the first and the third movable lens groups are movable monotonically during zooming.

4. A mechanical compensation zoom lens, comprising:

a first movable lens group movable along the optical axis for focusing and zooming of the zoom lens, the position of said lens group being closer to the image at the end of the wide angle range than at the end of the telephoto range;

a second movable lens group arranged closer to the image than the first movable lens group and fixed during focusing but movable along the optical axis with the first movable lens group but independently of the first movable lens group;

a third movable lens group closer to the image than the second movable lens group and fixed during focusing but movable along the optical axis with the first and the second movable lens groups and independently of the first lens group during zooming, the amount of movement of said third lens group along the optical axis for zooming being larger than that of the first movable lens group;

the image end of the third movable lens group including a negative fixed lens group and a positive fixed lens group arranged in sequence;

the first, the second, and the third movable lens groups and said negative fixed lens group forming an afocal optical system with the relations $$(f_1 + f_4) + 2(f_2 + f_3) + 2M \geq L \geq (f_1 + f_4) + 2(f_2 + f_3) - 2M$$

where, $L = e_1w + e_2w + e_3w$ $$M = \sqrt{\frac{(f_1f_3f_5 - f_2f_4f_t)(f_3f_4f_t - f_1f_2f_5)}{f_1f_4f_5f_t}}$$

$e_1w$, $e_2w$, $e_3w$ are distances between the principal points of the lens groups at the end of the wide angle side, $f_t$ is the Focal length of the whole system at the end of the telephoto range, $f_1$, $f_2$, $f_3$, $f_4$, and $f_5$ are the focal lengths of respective lens groups.

5. A zoom lens according to claim 4, wherein $$(L - f_1 + f_3 - e_{3w}) + \sqrt{(L - f_1 + f_3 - e_{3w})^2 - 4(L - f_1 - e_{3w})(f_2 + f_3)} + 4\frac{f_2f_3}{f_tf_4}(f_1f_5 + f_tf_4) \geq 2 e_{2t},$$

where $e_{2t}$ is the distance between the principal point of the second group and that of the third group at the end of the telephoto range.

* * * * *